(12) United States Patent
Nagahiro et al.

(10) Patent No.: US 6,982,852 B2
(45) Date of Patent: Jan. 3, 2006

(54) CARRIAGE ARM ASSEMBLY FOR MAGNETIC DISK DRIVE

(75) Inventors: Shin Nagahiro, Odawata (JP);
Masahiko Sega, Hiratsuka (JP);
Toshihiro Arisaka, Odawara (JP);
Toshihiko Shimizu, Yasato (JP);
Hiromitsu Masuda, Odawara (JP);
Tetsuya Hamaguchi, Tokyo (JP);
Gentaro Nakamura, Odawara (JP);
Takenori Atumi, Ushiku (JP)

(73) Assignee: Hitachi Global Storage Technologies Japan, Ltd., Kanagawa (JP)

( * ) Notice: Subject to any disclaimer, the term of this patent is extended or adjusted under 35 U.S.C. 154(b) by 172 days.

(21) Appl. No.: 10/372,833

(22) Filed: Feb. 26, 2003

(65) Prior Publication Data

US 2003/0218833 A1 Nov. 27, 2003

Related U.S. Application Data

(63) Continuation-in-part of application No. 10/157,087, filed on May 30, 2002, now Pat. No. 6,879,467.

(30) Foreign Application Priority Data

Oct. 30, 2001 (JP) ........................................ 2001-331842
Nov. 11, 2002 (JP) ........................................ 2002-326262

(51) Int. Cl.
*G11B 5/55* (2006.01)

(52) U.S. Cl. ................................................... 360/265.9
(58) Field of Classification Search .............. 360/265.7, 360/265.9–266
See application file for complete search history.

(56) References Cited

U.S. PATENT DOCUMENTS

| | | | | | |
|---|---|---|---|---|---|
| 5,801,905 | A | * | 9/1998 | Schirle et al. | 360/265.9 |
| 5,936,808 | A | * | 8/1999 | Huang et al. | 360/265.9 |
| 6,091,574 | A | * | 7/2000 | Misso | 360/265.9 |
| 6,563,676 | B1 | * | 5/2003 | Chew et al. | 360/264.7 |

OTHER PUBLICATIONS

JP-A-4-168671.

U.S. Appl. No. 10/157,087, filed May 30, 2002.

* cited by examiner

*Primary Examiner*—A. J. Heinz
(74) *Attorney, Agent, or Firm*—Antonelli, Terry, Stout & Kraus, LLP

(57) ABSTRACT

A magnetic disk drive having a high recording density and enabling high speed transfer is achieved by reducing vibration of a carriage arm assembly to reduce a positioning error. The disk drive is configured so that a carriage arm is configured by two arm portions, the arm portions being coupled to each other by a restraint member through a viscoelastic material, the restraint member being supported on a carriage body or an area of the carriage arm in the vicinity of the body by means of adhesion or a viscoelastic material. By providing a high damping effect against various vibration modes in which in-plane bending and out-plane bending of the carriage arm are generated, vibration of the carriage arm assembly is suppressed, so that the positioning error is reduced, thereby the magnetic disk drive having a high recording density can be achieved.

16 Claims, 5 Drawing Sheets

CARRIAGE ARM ASSEMBLY FOR MAGNETIC DISK DRIVE

CROSS-REFERENCES TO RELATED APPLICATIONS

This application is a continuation-in-part of application Ser. No. 10/157,087 filed May 30, 2002 now U.S. Pat No. 6,879,467.

BACKGROUND OF THE INVENTION

1. Field of the Invention

The present invention relates to a carriage arm assembly for a magnetic disk drive, in particular to a structure of a carriage arm assembly which is suitable for positioning a magnetic head.

2. Description of the Prior Art

Recently, in the field of a magnetic disk drive, it has been required to improve recording density in order to increase recording capacity. For this purpose, it is important to improve accuracy of positioning a magnetic head. However, as inhibition factors from improving the positioning accuracy, there are raised a positioning error due to vibration of a mechanism system resulting from rotation of a disk or from operation of positioning a carriage arm assembly, and a positioning error due to vibration added from the outside of the magnetic disk drive. In order to reduce these positioning errors, it is necessary to widen a servo band width in positioning-control, or reduce the vibration of the mechanism system.

Among these, the vibration of the mechanism system due to the operation of positioning the carriage arm assembly is mainly composed of a vibration component resulting from excitation of each part of the carriage arm assembly caused by a driving force input thereto when positioning the head to a target track during operation of moving the head from a track to another track.

Especially, a vibration mode in which in-plane bending and out-plane bending of a carriage arm (hereinafter referred to as simply "arm") are generated has a significant influence on the positioning accuracy because the head disposed at a tip end of the arm is swung in the case of a swing-type carriage arm assembly.

Further, also in a condition in which the head follows its target track after the head moves to the target track, a vibration component resulting from excitation of each part of the arm due to turbulence generated by rotation of a disk also has an influence on the positioning accuracy. Particularly, a primary vibration component of the in-plane bending of the arm is often generated at a frequency between several hundred Hz and 1 kHz, which may cause a problem.

Herein, a primary mode of the in-plane bending of the arm and a primary mode of the out-plane bending of the arm refer to a mode in which each of a plurality of arms deforms in the same manner as a primary bending of a cantilever, and a secondary mode of the in-plane bending of the arm and a secondary mode of the out-plane bending of the arm refer to a mode in which each of the plurality of arms deforms in the same manner as a secondary bending of the cantilever.

Further, there is a problem that a read/write speed of the disk drive is reduced because a time until reading-out or writing-in of data become possible is increased due to residual vibration in the positioning operation.

As a method for reducing the residual vibration, there has been raised a method of reducing the vibration by using a viscoelastic material as described in JP-A-4-168671.

According to the method, there is provided a structure in which at least a pair of spring means are provided, of which one end is fixed to a body and of which another end applies a spring force via the viscoelastic material to the arm. By this structure, a relative displacement is generated between the arm and a plate spring in the vibration mode in which the out-plane bending of the arm is generated, so that a strain is generated in the viscoelastic material placed between the arm and the plate spring to damp the vibration of the arms.

According to a method disclosed in JP-A-4-168671, although a damping effect due to the strain in the viscoelastic material can be expected for the vibration mode in which the out-plane bending of the arm is generated, there is a problem, in the vibration mode in which the in-plane bending of the arm is generated, that the arm, the viscoelastic material, and the plate spring are integrally vibrated because a direction of displacement of the arm corresponds to a direction toward which the plate spring are urged, so that the strain is not generated in the viscoelastic material and therefore no damping effect is obtained.

In addition, there is also considered a problem that the arm is deformed due to a structure in which the arm is urged from a side thereof by the plate spring. Considering the case that the arm is pushed by the plate spring only from one side of the arm, off-track may occur with time, and a distance between heads may change and increase in comparison with an initial state, particular in the case of a rotary actuator system. Further, in this case, it is considered that imbalance in rigidity of the arm occurs so that the out-plane vibration is readily observed in a disk radial direction. Thus, it is necessary to provide the above described plate springs on both sides of the arm, and the plate springs are required to have a spring structure so as to cover a wide area in a side surface of the carriage arm assembly, therefore a relatively large degree of increase in weight with respect to the weight of the entire carriage is required. As a result, it is considered that new problems need to be solved, such as narrowing of a servo band width due to deterioration in access time or reduction of a main resonant frequency.

In this application, in order to solve the above described problems, it is an object of the present invention to provide a magnetic disk drive which has a large recording capacity by reducing residual vibration in operation of positioning a head and vibration due to disk rotation wind turbulence when the head follows its target track to improve positioning accuracy and thereby improve recording density. Further, there is provided a structure of a carriage arm assembly of the magnetic disk drive which enables high speed transfer by reducing a positioning error to improve a read/write speed.

BRIEF SUMMARY OF THE INVENTION

There is provided a structure in which the carriage arm includes a fixation portion of a suspension and a first and second arm portions placed substantially parallel to a disk surface; a restraint member having a surface opposing to the first arm portion and the second arm portion is provided; and the restraint member is coupled to each of the first arm portion the second arm portion respectively intervened with a viscoelastic material; and the restraint member and a body are fixed by adhesion. By providing a damping structure in the center portion of the arm, it becomes possible to provide a structure in which rigidity of the arms becomes symmetric, the weight of the arm is reduced, and the number of parts is reduced.

In a vibration mode in which in-plane bending of the arms is generated, respective relative displacements of the first arm portion and the second arm portion with respect to the restraint member generate in an in-plane direction, which results in a large strain in a viscoelastic material disposed between each arm portion and the restraint member, therefore a damping effect of the viscoelastic material can be improved. On the other hand, in a vibration mode in which out-plane bending of the arms is generated, respective relative displacements of the first arm portion and the second arm portion with respect to the restraint member generate in an out-plane direction, which results in a large strain in the viscoelastic material provided between each arm portion and the restraint member, therefore the damping effect of the viscoelastic material can be improved.

The first arm portion and the second arm portion are shaped to have wider center portions than body side ends or suspension side ends, which can further improve the damping effect. Because rigidities in the ends are relatively low when comparing under the same head displacement in arm bending deformation, deformation occurs not in the wide center portions but in the ends. Therefore a relative displacement between the first arm portion and the second arm portion is larger and thus a larger strain is generated between each arm portion and the restraint member.

In a structure in which the restraint member is fixed to the body, the restraint member does not displace so that a damping effect is generated by the viscoelastic material provided between the first arm portion and the second arm portion which displace in the same out-plane direction. Assuming that the restraint member is not fixed to the body and supported only by the first arm portion and the second arm portion, when the first arm portion and the second arm portion displace in the same out-plane direction, the first arm portion, the second arm portion, the restraint member, and the viscoelastic materials are integrally displaced so that the damping by the viscoelastic materials is insufficient.

It is not necessary to adhere the above described restraint member to the body, and the restraint member can be supported by a viscoelastic material In this case, in addition to the viscoelastic materials between the first and second arm portion and the restraint member, the viscoelastic material between the above described restraint member and the body contributes to the damping. Comparing the case that the restraint member is adhered to the body and the case that the restraint member is supported by the viscoelastic material under a condition of the same relative displacement, in the method of supporting by the viscoelastic material, a total area of the viscoelastic material which shares a strain by the relative displacement is wider, and thus the strain in one part of the viscoelastic material is smaller.

By providing a structure in which the restraint member having a surface opposing to inner side surfaces of the first arm portion and the second arm portion is placed between the first arm portion and the second arm portion, and in which the first arm portion and the second arm portion are coupled to each other via the viscoelastic materials, that is, by providing a structure in which the restraint member and the viscoelastic materials are fittingly accommodated in a hole portion of the arms, it is possible to obtain a damping structure without increasing thickness of the arms.

By providing a structure in which a long tail portion corresponding to a wiring portion for an electrical signal of a magnetic head is placed between the first arm portion and the second arm portion, and in which the long tail portion serves also as the restraint member, it is possible to reduce the number of parts.

By a structure in which respective arms are separate parts and in which the carriage arm assembly is configured by stacking a plurality of the arms, it is possible to assemble the carriage arm assembly after disposing a restraint member, a viscoelastic material and the like of each arm, so that workability can be substantially improved.

The structure includes the restraint member for each arm, which member is previously integrally formed, so that the number of parts can be reduced, and the number of working processes can be reduced.

By providing the restraint member with a hole portion on which the viscoelastic material is pressed, it is possible to achieve a structure having a good assembling ability.

A light material such as a resin may be used for the restraint member so that the weight of the entire carriage arm assembly is reduced, thereby it is possible to prevent the access time from being slower, prevent the servo band width from being narrower due to lowering of a main resonant frequency, and eliminate other inconveniences.

Other objects, features and advantages of the invention will become apparent from the following description of the embodiments of the invention taken in conjunction with the accompanying drawings.

DETAILED DESCRIPTION OF THE INVENTION

Figure 1:
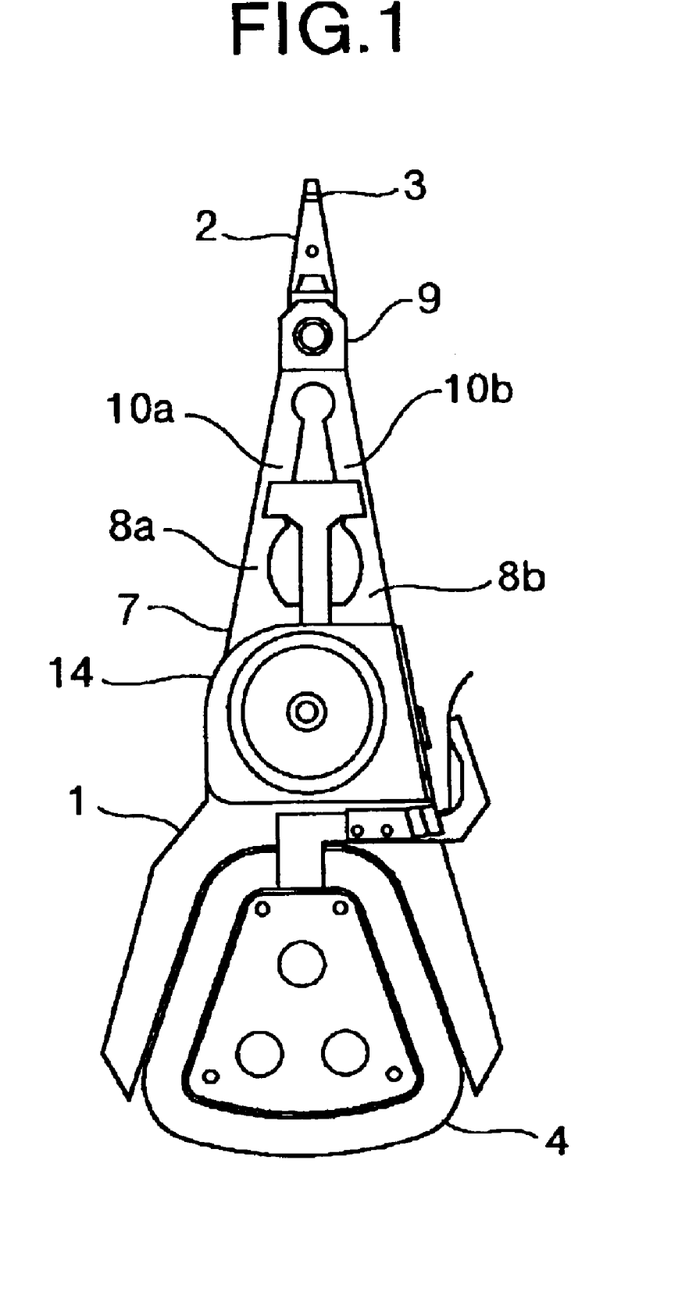
FIG. 1 is a top view of a carriage arm assembly according to a first embodiment.
Figure 2:
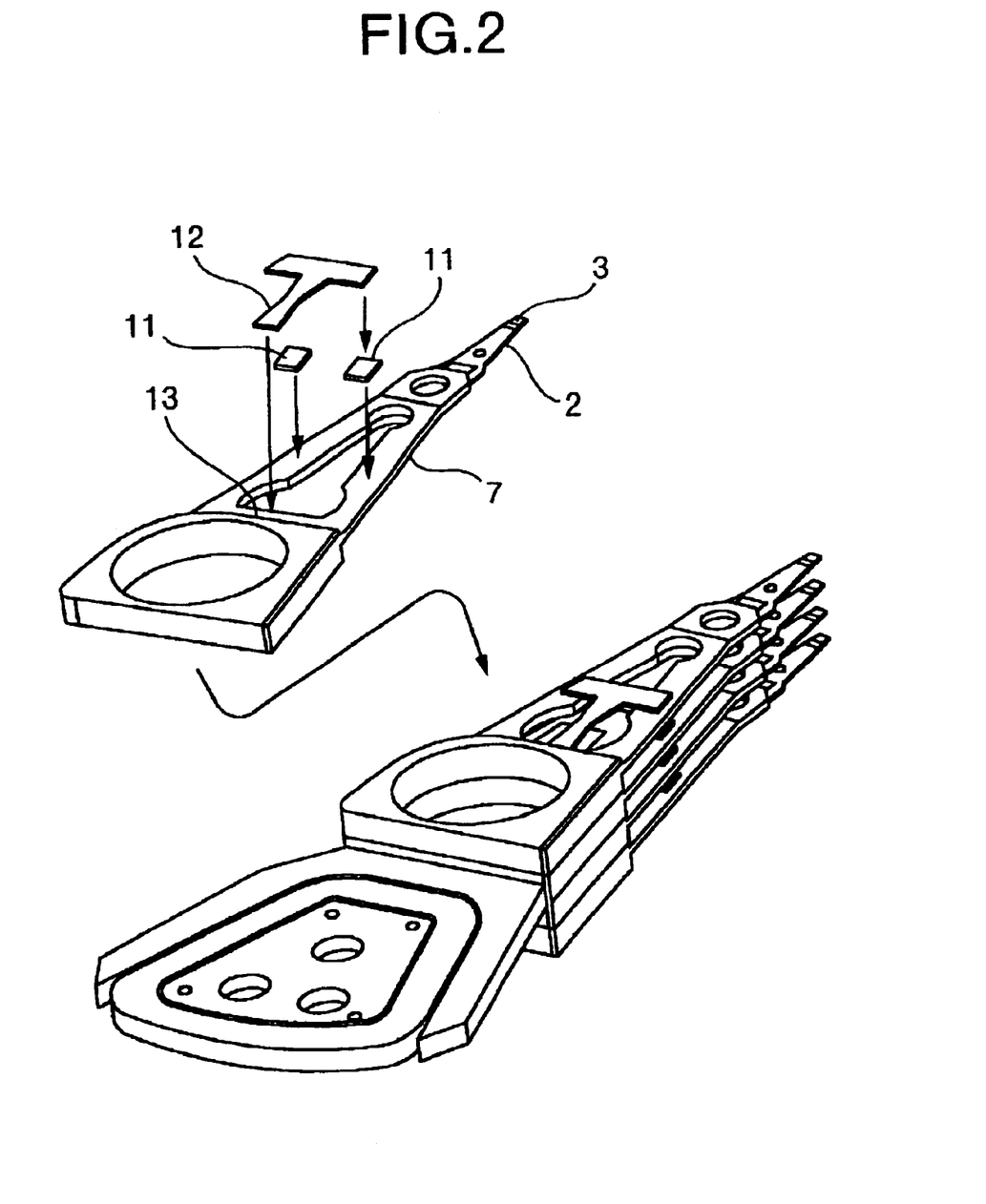
FIG. 2 is a perspective view illustrating a method of assembling the carriage arm assembly according to the first embodiment.
Figure 3:
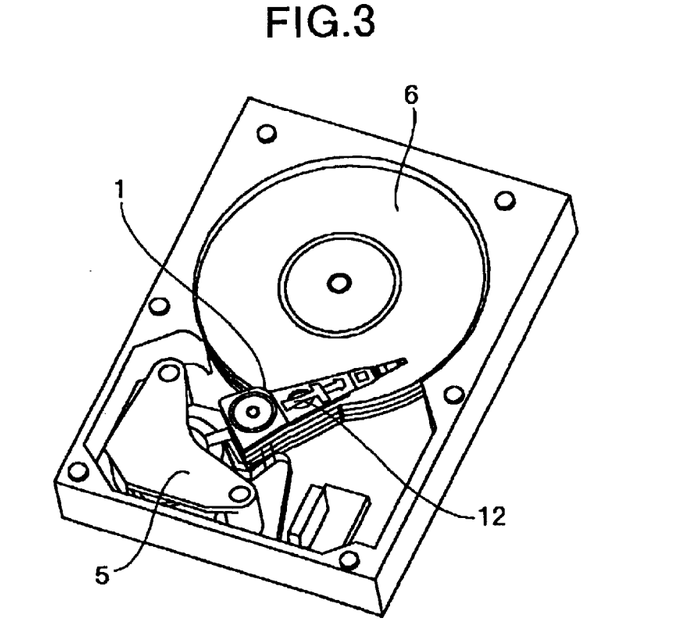
FIG. 3 is a schematic view of a magnetic disk drive to which the first embodiment is applied.

FIG. 1 is a top view of a carriage arm assembly according to a first embodiment to which the present invention is applied, and FIG. 2 is a perspective view illustrating a method of assembling the carriage arm assembly. In addition, an example of a magnetic disk drive equipped with the carriage arm assembly according to the present invention is shown in FIG. 3.

A slider 3 equipped with a magnetic head (not shown) is mounted at a tip end of the carriage arm assembly 1 via a suspension 2. By passing electric current through a coil 4, a force is generated between a voice coil motor 5 and the coil 4 so that the carriage arm assembly 1 can rotate about a bearing portion to position the slider 3 at any radial location on a disk 6.

A carriage arm 7 includes a first arm portion 8a and a second arm portion 8b, and a fixation portion 9 for the suspension. A T-shaped restraint board 12 is affixed through viscoelastic materials 11 to surfaces of arm center portions 10a and 10b parallel to a disk surface, so as to bridge between the arm portions, while a residual end of the T-shape is adhesively fixed to an arm root portion 13. In this example, the restraint board 12 is made of a stainless steel board having a thickness in the order of 50 to 200 $\mu$m, and the viscoelastic materials 11 are made of an adhesive material having a thickness in the order of 50 to 100 μm.

Further, the first arm portion 8a and the second arm portion 8b are shaped to have the wider center portions than body side end portions and suspension side end portions thereof. Thus, because the rigidities in the end portions are relatively low when comparing under the same head displacement in arm bending deformation, the deformation occurs not in the wider center portions but in the end portions. Therefore, a relative displacement between the first arm portion 8a and the second arm portion 8b is larger while the restraint board 12 is adhesively fixed in the vicinity of the body 14 and also has enough rigidity to maintain its length constantly, so that a shearing strain is generated within the viscoelastic materials 11. The viscoelastic materials 11 convert the strain energy into heat energy to dissipate the energy, so that a damping effect is generated. According to the mechanism, as the strains generated in the viscoelastic materials 11 become larger, that is, as relative displacements between the restraint board 12 and the center portions 10a and 10b of the arm portions become larger, the dissipated energy also becomes larger, so that the damping effect is more improved.

As shown in FIG. 2, in this system, the respective carriage arms are made from separate parts, and the carriage arm assembly is configured by stacking a plurality of the arms. It is apparent that the assemble can be performed after the restraint member, the viscoelastic materials and the like of each arm are previously placed on the arm, and that vibration can be effectively reduced by adding damping structures to all arms, which can substantially improve workability.

Figure 4:
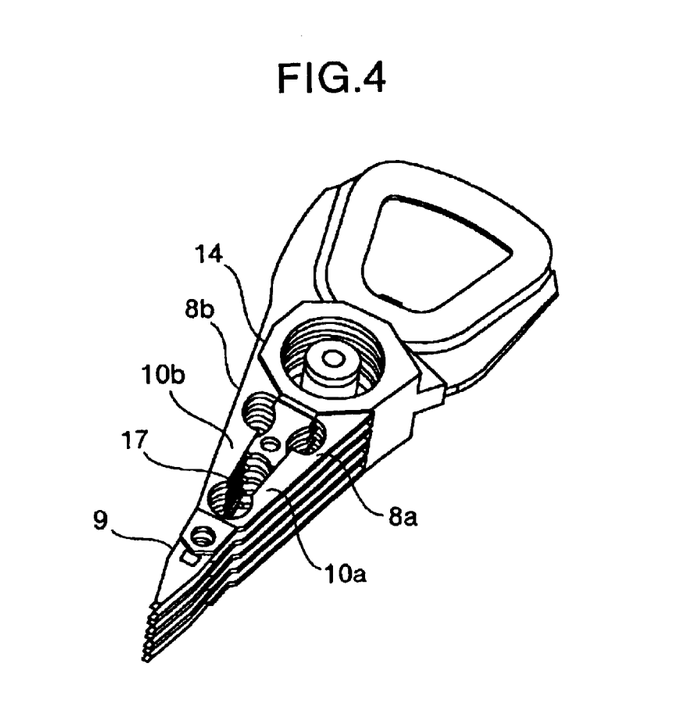
FIG. 4 is a perspective view of a carriage arm assembly according to a second embodiment.
Figure 5:
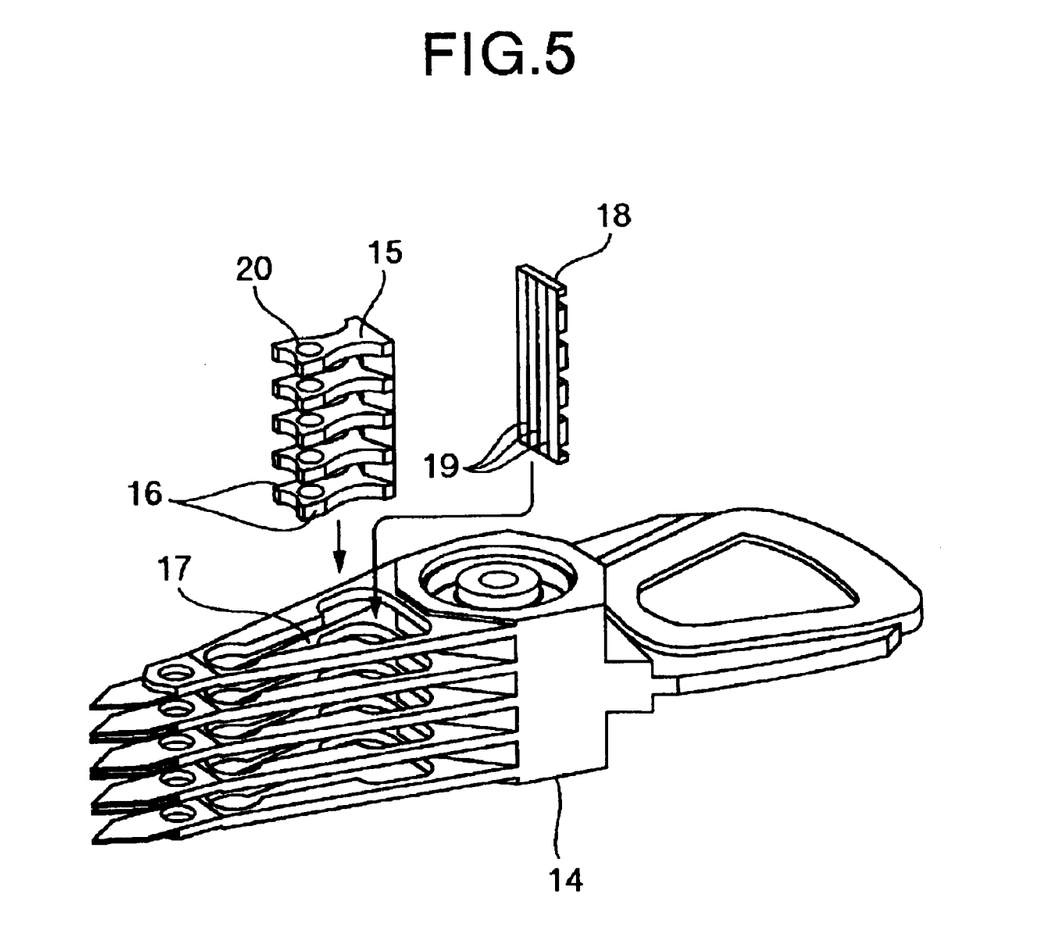
FIG. 5 is a perspective view illustrating a method of assembling the carriage arm assembly according to the second embodiment.

FIG. 4 is a perspective view of a carriage arm assembly according to a second embodiment to which the present invention is applied, and FIG. 5 is a perspective view illustrating a method of assembling the carriage arm assembly.

Each carriage arm 7 is provided with a hole portion 17 which is surrounded by arm portions 8a and 8b, a fixation portion 9 for the suspension, and a body 14, and an arm damper main body 15 is placed in the hole portions 17 in an inscribed manner. A material of the arm damper main body 15 is a resin, and the arm damper main body 15 has a structure as shown in FIG. 5 in which restraint members of the arms are integrally formed and is adhesively fixed through an arm damper fixation portion 18 to the body 14. Further, in order to avoid interference with the rotating disk, a construction between the arms is configured as a constriction in which the disk is located, and the restraint member of each arm has the same thickness as that of the arm. The viscoelastic material 16 placed between two arm portions and the restraint member of each arm is an adhesive material having thicknesses in the order of 50 to 200 μm, in this example.

With respect to the shapes of the arms, as with the case of the first embodiment, the first arm portion 8a and the second arm portion 8b are shaped to have wider center portions than body side end portions or suspension side end portions.

In addition, forcing holes 20 are provided in the arm damper main body 15 to improve the workability.

In this embodiment, substantial reduction in the number of parts and improvement in the workability are achieved by integrating the restraint members of the arms into one part. Further, a structure can be provided in which the restraint members and the viscoelastic materials are fittingly accommodated in the hole portions of the arms by forming inner side surfaces of the arms as surfaces for affixing the viscoelastic materials thereon, so that this method in which a damping mechanism can be added without increasing thicknesses of the arms is a very effective means with respect also to thinning of the disk drive.

Now, an assembling method according to this embodiment will be explained in reference to FIG. 5. At first, the viscoelastic materials 16 are previously affixed to surfaces of the arm damper main body 15 in which the restraint members of the arms are integrally formed, which surfaces oppose to the respective arm portions of the arms. The number of the viscoelastic materials 16 is two for each arm.

On the other hand, on the body side of hole portion 17 in the carriage arm assembly, the arm damper fixation portion 18 is previously adhesively situated. This is because the arm damper main body 15 can not be directly mounted on the body 14 due to the difficulty in eliminating inherent steps in view of burr removal machining, and it is aimed to form a flat surface, on which the arm damper main body 15 is mounted, by using the arm damper fixation portion 18 which is another part. Further, groove portions 19 for flowing adhesive therethrough are provided in the surface of the arm damper fixation portion 18 on which the arm damper is mounted.

Then, the arm damper main body 15 is inserted into the hole portions 17 from the upper side of the carriage arm assembly. At this time, the arm damper main body 15 is forced onto the arm damper fixation portion 18, and is slid to insert into the hole portions 17 so as not to inadvertently contact the viscoelastic materials 16 and the arm portions 8a and 8b of the arms. In addition, clearances of 0.2 mm are provided between the viscoelastic material 16 and the arm portions 8a and 8b of the arms. After the arm damper main body 15 is inserted in the hole portions 17, a bar is inserted into the forcing holes 20 provided in the center of the arm damper main body 15 to push the arm damper main body 15 toward the head side so as to adhere the viscoelastic material 16 onto the arm portions 8a and 8b of the arms. Each hole portion 17 of the arms has a configuration that its width is smaller as approaching toward the head side, and the adhesion can be achieved only by linearly forcing the arm damper main body 15 toward the head side. Finally, the arm damper main body 15 and the arm damper fixation portion 18 are adhered to each other. At this time, they are adhesively fixed by flowing adhesive into the groove portions 19 provided in the arm damper fixation portion 18.

Figure 6:
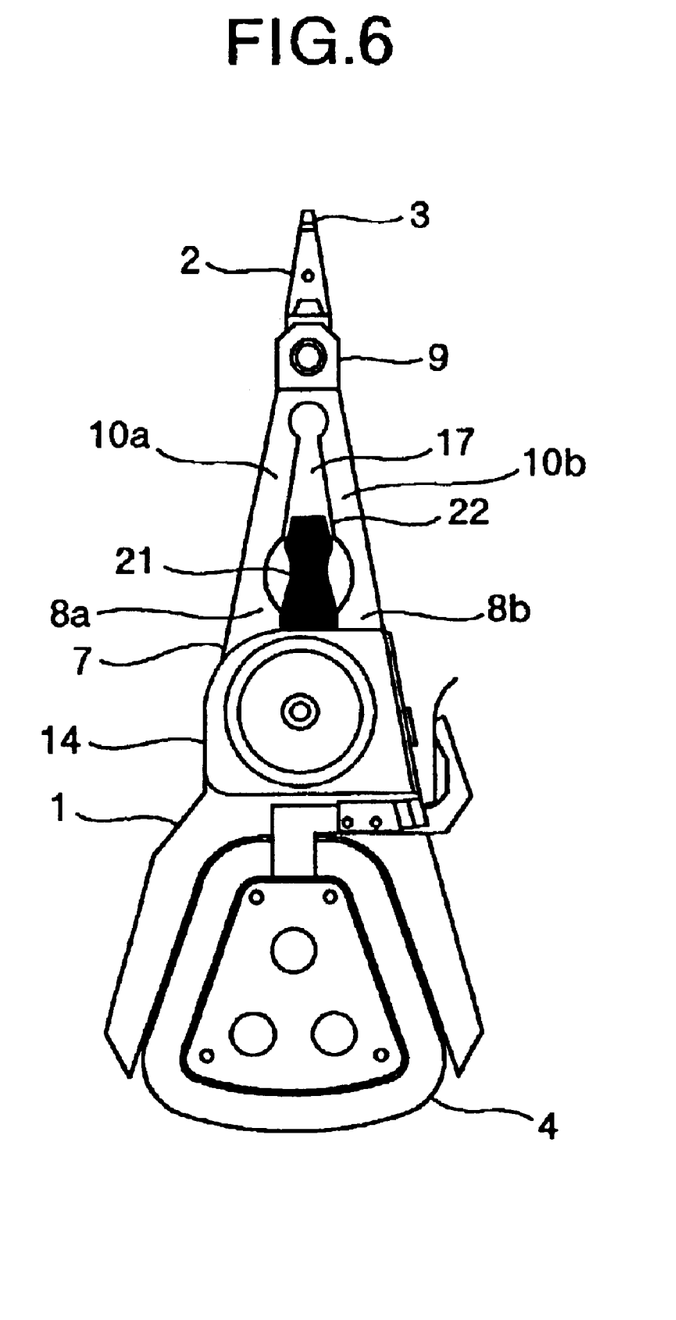
FIG. 6 is a top view of a carriage arm assembly according to a third embodiment.

FIG. 6 is a top view of a carriage arm assembly according to a third embodiment to which the present invention is applied. Each carriage arm 7 is provided with a hole portion 17 which is surrounded by the arm portions 8a and 8b, the fixation portion 9 for the suspension, and the body 14, and the arm damper member 21 made of resin is previously molded in the hole portions 17. Gaps having a width of 50 μm to 200 μm are provided between the arm damper member 21 and the arm portions 8a and 8b of the arms, and fluid viscoelastic material 22 is flowed into the gaps and stuck therein to fill in the gaps between the arm damper member 21 and the arm portions 8a and 8b. This enables substantial elimination of processes, such as a process of mounting the arm damper member, so that substantial reduction in the number of processes and parts is achieved.

By using a carriage arm assembly according to the first, second, or third embodiments of the present invention, a high damping effect can be provided in various vibration modes in which the in-plane bending of the arm is generated. Especially, a magnetic disk drive which enables rapid transfer and has superior reliability can be provided in which residual vibration in operation of positioning a head and wind turbulence vibration of the arm when the arm follows its target cylinder are reduced, and a read/write speed of the disk drive is improved.

In the above description, the term "in-plane" is in connection with a direction along a plane parallel to a disk surface, and the term "out-plane" is in connection with an axial direction perpendicular to the disk surface. In addition, horizontal to vertical ratios, and a dimensional ratio of each part in the drawings used in the above description are not always precise for convenience.

In summary, features of a suspension according to the present invention will be listed below.

1) A carriage arm assembly including: a slider equipped with a magnetic head for reading and writing information from/to a disk; a suspension for holding the slider and applying a predetermined load to the slider; a carriage arm to which the suspension is fixed; and a body to which the carriage arm is fixed, which body has a pivot shaft and a VCM coil, wherein: the carriage arm includes a fixation portion for the suspension and first and second arm portions placed substantially parallel to a disk surface; a restraint member is provided, the restraint member having a surface opposing to the first and second arm portions, and being coupled to the first and second arm portions through a viscoelastic material; and the restraint member is fixed to the body or a portion of the carriage arm in the vicinity of the body by means of adhesion.

2) A carriage arm assembly including: a slider equipped with a magnetic head for reading and writing information from/to a disk; a suspension for holding the slider and applying a predetermined load to the slider; a carriage arm to which the suspension is fixed; and a body to which the carriage arm is fixed, which body has a pivot shaft and a VCM coil, wherein: the carriage arm includes a fixation portion for the suspension and first and second arm portions placed substantially parallel to a disk surface; and a restraint member is provided, the restraint member having a surface opposing to the first and second arm portions, and being coupled to the first and second arm portions and the body or a portion of the carriage arm in the vicinity of the body through a viscoelastic material.

3) A carriage arm assembly including: a slider equipped with a magnetic head for reading and writing information from/to a disk; a suspension for holding the slider and applying a prescribed load to the slider; a carriage arm to which the suspension is fixed; and a body to which the carriage arm is fixed, which body has a pivot shaft and a VCM coil, wherein: the carriage arm includes a fixation portion for the suspension and first and second arm portions placed substantially parallel to a disk surface; and a restraint member which has a surface opposing to inner side surfaces of the first and second arm portions is disposed between the first and second arm portions, the restraint member being fixed to the body or a portion of the carriage arm in the vicinity of the body by means of adhesion, and being coupled to the first and second arm portions through a viscoelastic material.

4) A carriage arm assembly including: a slider equipped with a magnetic head for reading and writing information from/to a disk; a suspension for holding the slider and applying a predetermined load to the slider; a carriage arm to which the suspension is fixed; and a body to which the carriage arm is fixed, which body has a pivot shaft and a VCM coil, wherein: the carriage arm includes a fixation portion for the suspension and first and second arm portions placed substantially parallel to a disk surface; and a restraint member which has a surface opposing to inner side surfaces of the first and second arm portions is disposed between the first and second arm portions, the restraint member being coupled to the body or a portion of the carriage arm in the vicinity of the body through a viscoelastic material, and being coupled to the first and second arm portions through a viscoelastic material.

5) A carriage arm assembly according to the above item 1, characterized by having a structure in which a long tail portion corresponding to a wiring portion for an electrical signal of the magnetic head is disposed between the first and second arm portions, the tail portion also serving as the restraint member.

6) A carriage arm assembly according to the above item 2, characterized by having a structure in which a long tail portion corresponding to a wiring portion for an electrical signal of the magnetic head is disposed between the first and second arm portions, the long tail portion also serving as the restraint member.

7) A carriage arm assembly according to the above item 1, characterized in that each arm is configured as a separate part, and the carriage arm assembly is configured by stacking a plurality of the arms.

8) A carriage arm assembly according to the above item 2, characterized in that each arm is configured as a separate part, and the carriage arm assembly is configured by stacking a plurality of the arms.

9) A carriage arm assembly according to the above item 3, characterized in that each arm is configured as a separate part, and the carriage arm assembly is configured by stacking a plurality of the arms.

10) A carriage arm assembly according to the above item 4, characterized in that each arm is configured as a separate part, and the carriage arm assembly is configured by stacking a plurality of the arms.

11) A carriage arm assembly according to the above item 5, characterized in that each arm is configured as a separate part, and the carriage arm assembly is configured by stacking a plurality of the arms.

12) A carriage arm assembly according to the above item 6, characterized in that each arm is configured as a separate part, and the carriage arm assembly is configured by stacking a plurality of the arms.

13) A carriage arm assembly according to the above item 3, characterized in that the restraint members of the carriage arms are integrally formed.

14) A carriage arm assembly according to the above item 3, characterized in that the restraint member is previously molded together with the carriage arm, and a viscoelastic material is disposed between the restraint member and the first and second arm portions by filling a fluid viscoelastic material in a gap between the restraint member and the first and second arm portions and then sticking the fluid viscoelastic material therein.

15) A carriage arm assembly according to the above item 3, characterized in that the restraint member is previously molded together with the carriage arm, and is coupled to the first and second arm portions respectively by molding.

16) A carriage arm assembly according to the above item 3, characterized in that a hole portion is provided in the restraint member for pressing the viscoelastic material.

17) A carriage arm assembly according to the above item 13, characterized in that a hole portion is provided in the restraint member for pressing the viscoelastic material.

18) A carriage arm assembly according to the above items 1 to 17, characterized in that the first and second arm portions are shaped to have wider center portions than body side end portions or suspension side end portions.

According to the invention, it is possible to provide a high damping effect against various vibration modes in which in-plane bending and out-plane bending of a carriage arm is generated. It is also possible to reduce a positioning error by suppressing vibration of a carriage arm assembly. A magnetic disk drive having a high recording density can be provided. Also, a magnetic disk drive which enables high speed transfer can be provided, because a reading/writing speed of the disk drive can be improved.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A carriage arm assembly comprising: a slider on which a magnetic head is mounted for reading and writing information from/to a disk; a suspension for holding the slider and applying a predetermined load to the slider; a carriage arm to which the suspension is fixed; and a body to which the carriage arm is fixed, the body including a pivot shaft and a VCM coil, wherein the carriage arm comprises a fixation portion for the suspension, and first and second arm portions disposed substantially parallel to a disk surface and seperated from each other by a gap, the first arm portion and the second arm portion are coupled to a restraint member intervened with a viscoelastic material having a thickness, which restraint member has a surface opposing to the first and second arm portions, so that the first and second arm portions, the restraint member and the viscoelastic material form a three layer structure at the opposing surface portion of the restraint member and the first and second arm portions, and the restraint member is also fixed to the body or a portion of the carriage arm in the vicinity of the body by means of adhesion, so that the restraint member, and the body or the portion of the carriage arm in the vicinity of the body form a two layer structure at the adhered portion.

2. The carriage arm assembly according to claim 1, wherein the restraint member has a T-shape.

3. The carriage arm assembly according to claim 1, wherein the thickness of the viscoelastic material is in the range of 50 to 100 μm.

4. The carriage arm assembly according to claim 1, wherein each of the first and second arm portions is shaped to have a center portion wider than a body side end portion and a suspension side end portion thereof.

5. A carriage arm assembly comprising: a slider on which a magnetic head is mounted for reading and writing information from/to a disk; a suspension for holding the slider and applying a predetermined load to the slider; a carriage arm to which the suspension is fixed; and a body to which the carriage arm is fixed, the body including a pivot shaft and a VCM coil, wherein the carriage arm comprises a fixation portion for the suspension, and first and second arm portions disposed substantially parallel to a disk surface and seperated from each other by a gap, and the first arm portion, the second arm portion, and the body or a portion of the carriage arm in the vicinity of the body are coupled to a restraint member intervened with a viscoelastic material having a thickness, which restraint member has a surface opposing to the first and second arm portions, so that the first and second arm portions, the restraint member and the viscoelastic material form a three layer structure at the opposing surface portion of the restraint member and the first and second arm portions.

6. The carriage arm assembly according to claim 5, wherein the restraint member has a T-shape.

7. The carriage arm assembly according to claim 5, wherein the thickness of the viscoelastic material is in the range of 50 to 100 μm.

8. The carriage arm assembly according to claim 5, wherein each of the first and second arm portions is shaped to have a center portion wider than a body side end portion and a suspension side end portion thereof.

9. A carnage arm assembly comprising: a slider on which a magnetic head is mounted for reading and writing information from/to a disk; a suspension for holding the slider and applying a predetermined load to the slider; a carriage arm to which the suspension is fixed; and a body to which the carriage arm is fixed, the body including a pivot shaft and a VCM coil, wherein the carriage arm comprises a fixation portion for the suspension, and first and second arm portions disposed substantially parallel to a disk surface and seperated from each other by a gap, and a restraint member which has a surface opposing to inner side surfaces of the first and second arm portions is disposed between the first and second arm portions so as to be coupled to the inner side surfaces of the first and second arm portions intervened with a viscoelastic material having a thickness, and is fixed to the body or a portion of the carriage arm in the vicinity of the body by means of adhesion.

10. The carriage arm assembly according to claim 9, wherein the restraint member has a T-shape.

11. The carriage arm assembly according to claim 9, wherein the thickness of the viscoelastic material is in the range of 50 to 100 μm.

12. The carriage arm assembly according to claim 9, wherein each of the first and second arm portions is shaped to have a center portion wider than a body side end portion and a suspension side end portion thereof.

13. The carriage arm assembly according to claim 12, wherein the restraint member has a T-shape.

14. A carriage arm assembly comprising: a slider on which a magnetic head is mounted for reading and writing information from/to a disk; a suspension for holding the slider and applying a predetermined load to the slider; a carriage arm to which the suspension is fixed; and a body to which the carriage arm is fixed, the body including a pivot shaft and a VCM coil, wherein the carriage arm comprises a fixation portion for the suspension, and first and second arm portions disposed substantially parallel to a disk surface and seperated from each other by a gap, and a restraint member which has a surface opposing to inner side surfaces of the first and second arm portions is disposed between the first and second arm portions so as to be coupled to the inner side surface of the first and second arm portions intervened with a viscoelastic material having a thickness, and is coupled to the body or a portion of the carriage arm in the vicinity of the body through a viscoelastic material.

15. The carriage arm assembly according to claim 14, wherein the thickness of the viscoelastic material is in the range of 50 to 100 μm.

16. The carriage arm assembly according to claim 14, wherein each of the first and second arm portions is shaped to have a center portion wider than a body side end portion and a suspension side end portion thereof.

* * * * *

UNITED STATES PATENT AND TRADEMARK OFFICE
CERTIFICATE OF CORRECTION

PATENT NO.       : 6,982,852 B2
APPLICATION NO. : 10/372833
DATED            : January 3, 2006
INVENTOR(S)      : Nagahiro et al.

It is certified that error appears in the above-identified patent and that said Letters Patent is hereby corrected as shown below:

On Title page Item - 30 - should read, (30) Foreign Application Priority Data

Oct. 30, 2001  (JP) ...........2001-331842
    Nov. 11, 2002  (JP) ...........2002-326262
    Nov. 8, 2001   (JP) ...........2001-342665

Signed and Sealed this

Tenth Day of April, 2007

JON W. DUDAS
*Director of the United States Patent and Trademark Office*